2,799,427
COMPOSITE CONTAINERS

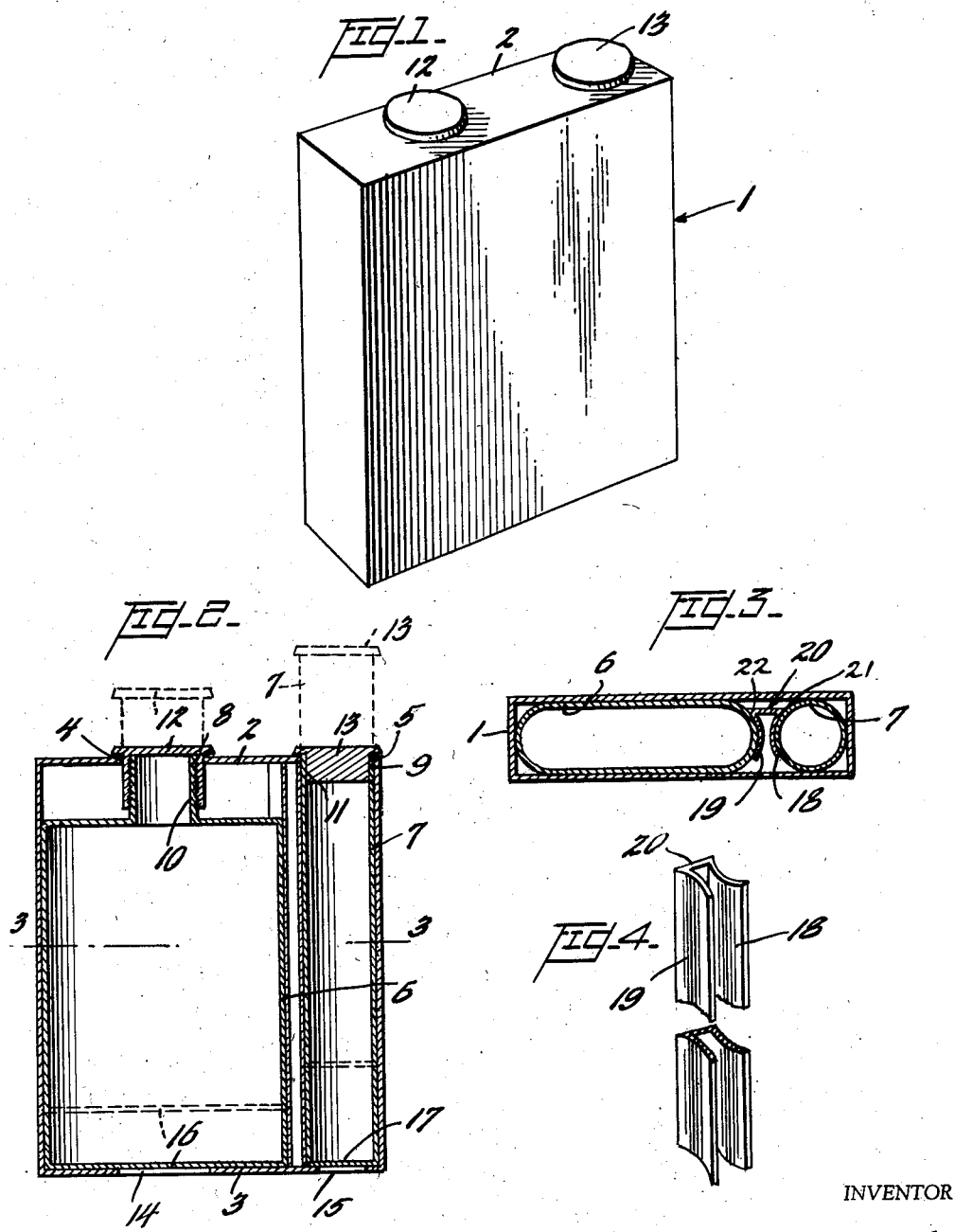

Abraham J. Shekter, Coral Gables, Fla., assignor to Adela F. Shekter

Application November 5, 1954, Serial No. 467,175

1 Claim. (Cl. 220—20)

This invention relates to composite containers and particularly, to a container in which a flask for liquids and a receptacle for pills or other medicine are incorporated in a single casing.

An object of the invention is to provide a container which cardiacs and others, who must be prepared to take a dose of medicine upon short notice wherever they may be, may use to carry in a pocket, both the medicine and a liquid with which to take it, the two being kept completely separate from each other and being accessible independently without danger of spillage or intermixture.

Another object of the invention is to provide a container, shaped to fit within a pocket, incorporating a pair of separate receptacles which may be opened and closed independently and which are movable independently from their normal positions within the general pocket-fitting contour of the container, to a projecting position for more convenient discharge of their contents.

Other objects and advantages of the invention will appear from the following description considered in conjunction with the attached drawings in which:

Figure 1 is a perspective view of the container of the present invention;

Figure 2 is a side elevational view, in section, of the assembly Figure 1;

Figure 3 is a view taken along the line 3—3 of Figure 2; and

Figure 4 is a perspective view, with portions broken away, of the resilient spacer interposed between the receptacles of the present invention.

Referring to the drawings, the reference numeral 1 designates a casing having a top wall 2 and a bottom wall 3. The top wall 2 is provided with a pair of spaced openings 4 and 5.

Within the casing 1, is a pair of receptacles 6 and 7 arranged in side by side, spaced relation with the facing walls of said receptacles 6 and 7 being convexly shaped, as shown at 22 and 21. The upper portion of the receptacle 6 is reduced to form a neck 8. Formed in the neck 8 of the receptacle 6 is a mouth 10, which mouth 10 is closed by a cover 12, detachably connected to the neck 8. A mouth 11 is formed in the upper end 9 of the receptacle 7 and is closed by a closure 13. Both the cover 12 and the closure 13 have enlarged portions at their upper ends which remain exteriorly of the top 2 of the casing 1, when the cover 12 and closure 13 are placed on the receptacles 6 and 7, and cover the edges of the openings 4 and 5 respectively. The receptacle 6 is supported in the casing 1 for sliding movement from its position within the casing 1, as shown in the solid lines in Figure 2, to a position in which the neck 8 extends exteriorly of the casing 1 through the opening 4, as shown in the broken lines in Figure 2. The receptacle 7 is supported in the casing 1 for sliding movement inwardly and outwardly of the casing 1 through the opening 5, as shown in the broken lines in Figure 2.

A pair of spaced apertures 14 and 15 is formed in the bottom wall 3 of the casing 1 to permit the application of manual pressure to the bottoms 16 and 17, respectively, of the receptacles 6 and 7, to cause the sliding movement of said receptacles 6 and 7. The apertures 14 and 15 are of appropriate size and shape to permit the insertion of a finger therethrough to press against the bottoms 16 and 17 of the receptacles 6 and 7 respectively and force their upper portions outwardly of the top wall 2 of the casing 1.

Interposed between the receptacles 6 and 7 and within the casing 1 is a resilient spacer 16 which biases the receptacles 6 and 7 away from each other and into frictional contact with opposed portions of the wall of the casing 1 to hold the receptacles 6 and 7 releasably in any of their sliding movement positions. The spacer 20 is preferably formed of a strip of resilient metal which is bent longitudinally into U shape with the leg portions 18 and 19 formed concavely to fit conformably against the facing convex walls 21 and 22 of the receptacles 7 and 6 when the spacer 16 is inserted therebetween. The spacer 20 is so arranged in the casing 1 that each of the leg portions 18 and 19 bears against the conforming wall of the complementary receptacle 7 and 6 to urge the receptacle into firm contact with adjacent portions of the casing 1. Each of the receptacles 7 and 6 is thus held frictionally but releasably between one of the leg portions 18 and 19 of the spacer 20 and the adjacent portion of the wall of the casing 1.

In use the receptacle 6 is filled with water, liquor or other suitable liquid while the receptacle 7 is filled with pills, powder or medicine in other form. The receptacles 6 and 7 are closed by their respective closures 12 and 13 and placed in their normal position within the casing 1, as shown in the solid lines in Figure 2, in which position they remain because of the frictional contact between the receptacles 6 and 7 and the abutting portions of the spacer 16 and the casing wall. In this condition, the container of the present invention presents the streamlined appearance of a pocket flask, cigarette case or compact and is suitably shaped to be carried in the pocket.

When it becomes necessary to take a dose of medicine the user of the container inserts his forefinger into the aperture 15 to press the receptacle 7 from its position within the casing 1 to its position extending from the casing 1, as indicated in the broken lines in Figure 2. When pushed to the extended position the receptacle 7 remains in that position by reason of the frictional contact between the spacer 16 and the walls of the casing 1. The end 9 of the receptacle 7 is thus moved to a position of easy access in which the closure 13 may be readily removed from the mouth 11 and a dose of medicine withdrawn therethrough. When the medicine has been withdrawn, the closure 13 is replaced upon the receptacle 7 and the receptacle 7 is returned to its position within the casing 1 by the pressure of the thumb upon the outer portion of the closure 13. The receptacle 6 is then pressed from its position within the casing 1 to its position extending from the casing 1, by the insertion of the forefinger through the aperture 14. The movement of the receptacle 6 to the extended position extends its mouth 10 beyond the rest of the container into a position in which the liquid may be easily poured or drunk therefrom. When the liquid has thus been taken the closure 12 is returned to the receptacle 6 and the receptacle 6 is pushed back into the casing 1 by pressure of the thumb upon the outer portion of the closure 12. The container is now ready for reinsertion into the pocket.

It will be obvious from the foregoing description that the container of the present invention constitutes an extremely useful article for carrying a supply of medicine and a supply of liquid upon the person of a user, being of appropriate size and shape to fit smoothly into the pocket, maintaining complete separation between the substances carried, and being readily adjustable so that a separate outlet for each substance can be independently extended beyond the normal contour of the container to facilitate its opening or closing and the insertion or discharge of substances therethrough.

What is claimed is:

A composite container comprising a casing having a top wall and a bottom wall, said top wall being provided with a pair of spaced openings, a pair of receptacles arranged in side by side spaced relation within said casing with the facing walls of said receptacles being convexly shaped, the upper portion of one of said receptacles being reduced to form a neck, a detachable cover upon said neck, said neck and cover being received in one of said openings, the upper portion of the other of said receptacles being received in the other of said openings, means for supporting said one receptacle in said casing for sliding movement from a position within said casing to a position in which said neck extends exteriorly of said casing through said one opening, means for supporting the other of said receptacles in said casing for sliding movement inwardly and outwardly of said casing through said other opening, a spacer interposed between said receptacles within said casing and extending from top to bottom of said casing, said spacer comprising a strip of resilient material bent longitudinally into U shape with the leg portions formed concavely in the outward direction to fit conformably against the facing convex walls of said receptacles, said spacer being arranged so that each leg portion bears against the conforming wall of the complementary receptacle to bias said receptacle into contact with adjacent portions of the casing wall to hold said receptacle releasably in any of its sliding movement positions, and a pair of spaced apertures in the bottom wall of said casing through which manual pressure may be applied to the bottoms of said receptacles to cause their sliding movement.

References Cited in the file of this patent

UNITED STATES PATENTS

| | | |
|---|---|---|
| 444,689 | Brown | Jan. 13, 1891 |
| 1,424,471 | Goldberg | Aug. 1, 1922 |
| 2,035,327 | McCaffrey et al. | Mar. 24, 1936 |
| 2,148,319 | Negbaur | Feb. 21, 1939 |
| 2,363,256 | Manning et al. | Nov. 21, 1944 |

FOREIGN PATENTS

| | | |
|---|---|---|
| 378,976 | Great Britain | Aug. 22, 1932 |